United States Patent [19]

Cantrell

[11] Patent Number: 5,162,805
[45] Date of Patent: Nov. 10, 1992

[54] FREQUENCY DIVERSITY SIDELOBE CANCELLER

[75] Inventor: Ben H. Cantrell, Oxon Hill, Md.

[73] Assignee: The United States of America as represented by the Secretary of the Navy, Washington, D.C.

[21] Appl. No.: 550,097

[22] Filed: Feb. 19, 1975

[51] Int. Cl.⁵ ............................................. G01S 13/16
[52] U.S. Cl. ........................................ 342/379; 342/17; 342/159
[58] Field of Search ............... 343/100 LE;17.2 R; 342/17, 159, 379

[56] References Cited

U.S. PATENT DOCUMENTS 3,202,990  8/1965  Howells .................. 343/100 LE
3,881,177  4/1975  Len et al. ................ 343/100 LE Primary Examiner—Mark Hellner
Attorney, Agent, or Firm—Thomas E. McDonnell; Edward F. Miles

[57] ABSTRACT

A new system and technique for cancelling interference in frequency agile receiving systems. Main and auxiliary signals are supplied to a pair of multiple loop side-lobe cancellers which are capable of being tuned to different frequencies. At the same time, under the control of a timing clock, plural frequencies are selected and multiplexed between two channels at the time of a radar pulse transmission. The side-lobe cancellers and radar are coupled to the channels such that each caneller operates at a given frequency for two consecutive pulse periods, with the radar transmitting at said given frequency during the second pulse period. By continuously cycling between the two channels, each canceller is operating at the proper frequency to cancel interference even though the radar is changeing frequency on a pulse to pulse basis.

7 Claims, 2 Drawing Sheets

FREQUENCY DIVERSITY SIDELOBE CANCELLER

BACKGROUND OF THE INVENTION

The present invention relates to interference cancelling systems and more particularly to techniques for improving cancellation in a frequency agile radar system.

Generally, in signal receiving systems such as radar systems, signals received in the side-lobes of the radar antenna interfere with the isolation of desired signals received in the main lobe of the antenna. Accordingly, to isolate the main lobe signals, side-lobe cancellers have been used to cancel the side-lobe interference in the main radar antenna as exampled by U.S. Pat. No. 3,202,990.

Conventionally, such side-lobe canceller systems have employed a plurality of adaptive canceller loops using offset auxiliary interference signals to provide cancellation in the main radar signal. In some similarly known systems, baseband adaptive loops have used quadrature hybrid circuits to separate the auxiliary interference signal into I and Q components. When each of the I and Q components is coupled to form its own adaptive loop in parallel with the other, the auxiliary interference signals can again be subtracted to reduce interference in the main radar signal. In either case, however, the adaptive loops achieve cancellation by subtracting a properly weighted auxiliary interference signal from the signal in the main radar antenna, where the proper weights are derived in a correlation process operating over a narrow band of frequencies centered about a fixed frequency.

It has been found that while such known systems have been highly successful in achieving good cancellation in most instances, limitations are encountered when the radar frequency is changed on a pulse to pulse basis (frequency agility) as contrasted with conventional fixed frequency radars. This is due primarily to the finite settling time required by the adaptive canceler loops to develop a proper weight for good cancellation at the radar frequency. Therefore, while the frequency agile radar system is highly desirable because of its decreased susceptibility to hostile detection and countermeasure techniques, the limitations on cancellation, flexibility, and range, imposed by the loop settling times, significantly curtails the effectiveness of side-lobe cancellers in highly sophisticated radar systems, particularly in a barrage jamming environment.

Accordingly, the present invention has been developed to overcome the specific shortcomings of the above known and similar techniques and to provide an improved and more versatile interference cancelling system for use with modern radar systems.

SUMMARY OF THE INVENTION

It is therefore an object of the present invention to provide an interference cancelling system that is simple to implement yet highly reliable in operation.

Another object of the invention is to provide a side-lobe cancelling system that can be constructed from conventional elements and has high versatility for multi-mode operation.

A further object of the invention is to provide an improved side-lobe canceller system which overcomes the limitations of loop settling times.

A still further object of the invention is to provide an interference cancelling system that operates effectively with a frequency agile radar.

Still another object of the invention is to provide a side-lobe canceller system to protect a radar against barrage jamming at all times, even when the frequency changes on a pulse to pulse basis.

In order to accomplish these and other objects, the present invention utilizes a main channel sensor for receiving desired and interference signals as the main channel signal, and auxiliary channel sensors for receiving primarily auxiliary interference signals. The main and auxiliary channel sensors supply their respective signals to a pair of multiple loop side-lobe cancellers which are tunable to different frequencies and capable of operating in several modes. A radar clock, coupled to clock at the desired radar pulse repetition frequency, initiates radar pulse transmission and operates a frequency selector which provides a different frequency output for each radar clock pulse. The output of the frequency selector is multiplexed between two channels to provide the output frequency to one of the channels at each clock pulse. Each of the channels includes storage circuits coupled to one of the cancellers and to a multiplexer which couples a stored frequency to the radar transmitter. Contrary to conventional systems, the clock of the present invention controls channel storage and multiplexing such that each canceller is set to operate at a given output frequency for two consecutive clock pulse periods, and the radar transmits at the given frequency during the second pulse period. Since the clock produces continuous cycling between the two channels, each canceller operates at the radar transmission frequency for one pulse period prior to radar transmission. In this manner, each loop is able to settle at the required frequency prior to receiving the radar signal thereby increasing the cancellation, versatility, and effectiveness of the canceller system. Frequency agile radars are therefore able to be properly protected by known canceller systems while operating in different modes without the limitations normally imposed by loop settling times.

Other objects, advantages, and novel features of the invention will become apparent from the following detailed description of the invention when considered with the accompanying drawings wherein:

DETAILED DESCRIPTION OF A PREFERRED EMBODIMENT

Figure 1:
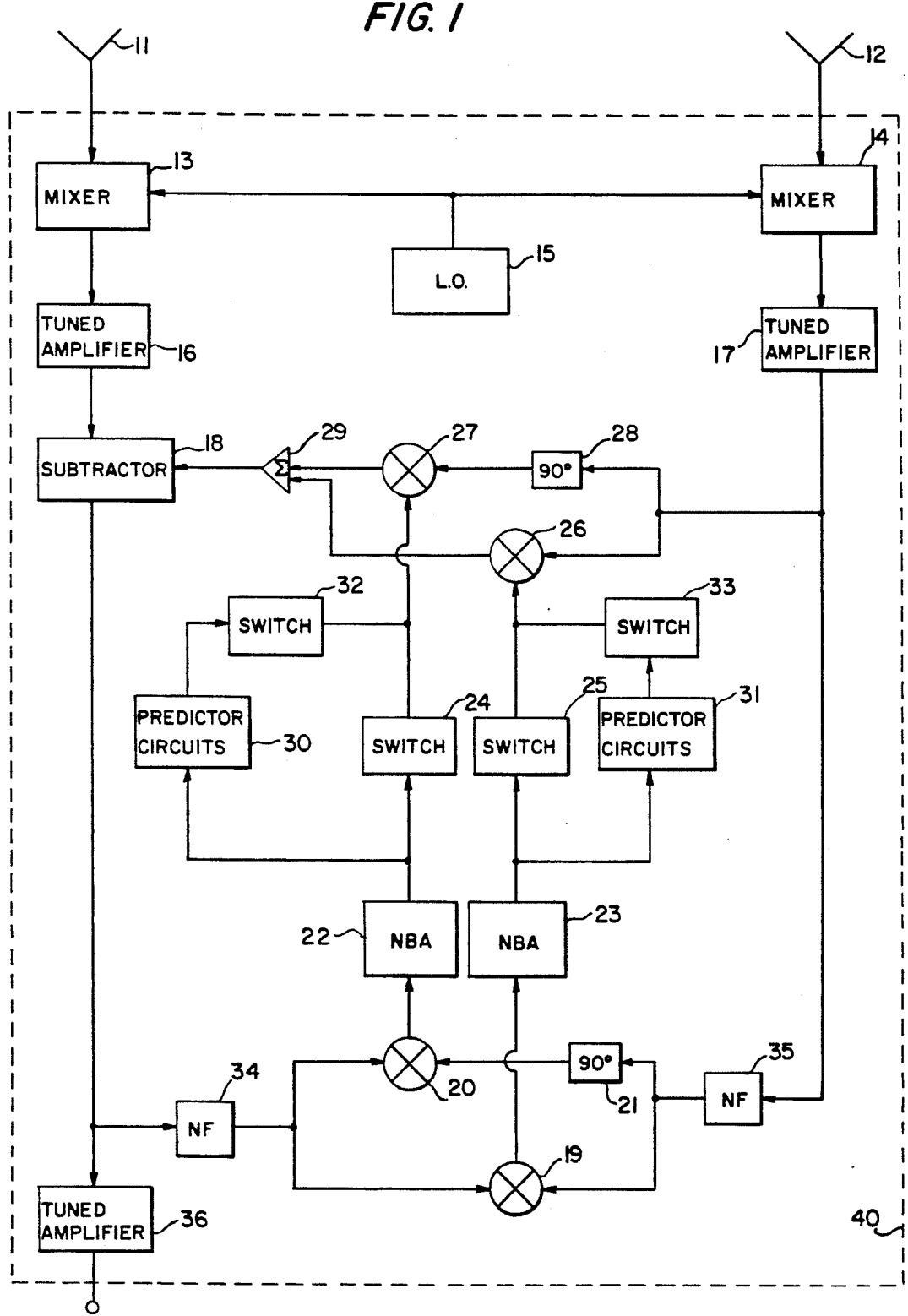
FIG. 1 is a schematic diagram showing a multi-mode side-lobe canceller for use in the canceller system according to the present invention.

Referring now to FIG. 1, a schematic diagram shows a coherent side-lobe canceller 40 for use in the side-lobe canceller system according to the present invention. In the present example, the invention will be described with reference to an intermediate frequency (IF) side-lobe canceller in a radar system, although the inventive teachings are equally applicable to other signal processing systems using similar concepts. Generally the system includes a main receiving channel sensor in the form of a directional radar antenna 11 and an independent auxiliary receiving channel sensor in the form of omnidirectional antenna 12 positioned in space relative to the main receiving antenna 11. As is known, the auxiliary antenna is positioned relative to the main antenna such that interference modulation is substantially correlated at both antennas. While the system being described only refers to the main antenna as a receiving antenna, the antenna 11 could Just as well be modified in a conventional manner to both transmit and receive. The main radar antenna 11 forms the main channel input for receiving desired radar signals and any interference that may be present from the side-lobes, while the auxiliary antenna 12 receives primarily interference and forms the independent auxiliary receiving channel input that provides samples of the environment in which the radar is attempting to operate. Signals from antenna 11 are mixed with the output of local oscillator 15 down to an IF in mixer 13 of conventional construction. In the same manner, signals from auxiliary antenna 12 are mixed with the output of oscillator 15 down to the same IF as the output of 13, in a similar mixer 14. The local oscillator 15, according to the present invention, can be constructed to be tunable over a range of frequencies and may comprise, for example, a digital voltage controlled oscillator (VCO) whose output frequency is determined by the digitally represented voltage at the VCO input. The outputs from 13 and 14 are coupled to conventional tuned amplifiers 16 and 17, respectively, constructed to have equal response characteristics and a bandpass centered at a fixed IF frequency. The output from 16 then constitutes the main channel signal and is coupled to a canceller loop along with the output from 17 constituting the auxiliary channel signal.

The canceller loop of the present example is generally composed of elements 18–35 and is constructed to provide multimode operation allowing versatility in use. The output from 16 is coupled to one input of a conventional subtractor 18 whose output is coupled in turn to the inputs of notch filter 34 and tuned amplifier 36. At the same time, the output of 17 is coupled as input to a second notch filter 35, as well as to multiplier 26, and through 90° phase shifter 28 to multiplier 27. Notch filters 34 and 35 are constructed as switchable notch filters such that the filter may be shorted and by-passed, or switched into the canceller loop. The output from filter 34 is coupled as a first input to multipliers 19 and 20 while the output of filter 35 is divided into in-phase and quadrature components and coupled as second inputs to multipliers 19 and 20. The in-phase component is coupled to 19 while the quadrature component is formed by passing the output of filter 35 through a 90° phase shifter and coupling to 20. Outputs from 19 and 20 are then coupled to high gain narrow band amplifiers 23 and 22, respectively, which have characteristics of a low-pass filter and produce in-phase and quadrature weight outputs that are slowly varying baseband signals. The outputs from 22 and 23 are each coupled to two branches which either pass the weights directly to a second input of multipliers 27 and 26, respectively, or pass the weights through predicting circuits 30 and 31 depending on the position of switches 24, 25, 32, and 33. When switches 24 and 25 are closed and 32 and 33 are open, the weights are coupled directly to multipliers 27 and 26. When switches 32 and 33 are closed and 24 and 25 are open, the weights are coupled via predicting circuits 30 and 31 to multipliers 27 and 26. The predicting circuits themselves do not constitute part of the present invention but can be constructed in the manner as taught in U.S. application Ser. No. 508,363 entitled "PREDICTING COHERENT SIDELOBE CANCELLER" to Bernard L. Lewis, filed in the United States on Sep. 23, 1974 and assigned to the same assignee as the present application. The output of the multipliers 27 and 26 are then combined in adder 29 and coupled as the second input to subtractor 18. While the side-lobe canceller 40 has been described with only one auxiliary antenna input, it should be recognized that plural auxiliary antenna inputs could be coupled to additional parallel loops to form a multi-loop canceller in a known manner.

The present side-lobe canceller operates on the principle that an interference signal entering the side-lobes of the main radar antenna will only be different in amplitude and phase from an interference signal entering a nearby auxiliary antenna, and can therefore be cancelled by subtracting a properly weighted auxiliary signal from the main channel signal. The proper weights are achieved by a correlation process operating over a narrow band of frequencies centered about a fixed frequency, which weights are taken from the outputs of 22 and 23.

According to the present example, the side-lobe canceller 40 can be operated in various modes to cancel interference, which modes will now be described with reference to FIG. 1. In a first mode, designed for clutter free environments, switches 32 and 33 are open and 24 and 25 closed and notch filters 34 and 35 shorted. The auxiliary interference signal from 17 is weighted by in-phase and quadrature weights from 23 and 22 and subtracted in 18 from the main channel signal to form a residue output from 18. The residue output from 18 is correlated with the in-phase and quadrature components from 17 in mixers 19 and 20 and filtered through 23 and 22 to form the in-phase and quadrature weights. After a finite settling time, the appropriately adjusted weights will cause the interference signal entering the main radar antenna 11 to be cancelled at the main channel output from 36. As is known, since the speed of response of the canceller loop is proportional to loop gain which, in turn, is proportional to average power input, the loop will tend to cancel interference (jamming) signals having high average power, while being relatively insensitive to radar returns.

In a second mode of operation, the switches 24 and 25 are open and 32 and 33 closed such that the weights are passed through predicting circuits 30 and 31 and then to multipliers 27 and 26. This mode is desirable when the radar must operate in a high clutter environment where a canceller loop would normally modify clutter and prevent the use of a Moving Target Indicator. Since the operation of the predictor circuits are described in detail in the referenced U.S. application Ser. No. 508,363, a further detailed discussion is considered unnecessary. Generally, however, the predicting circuits sample the weights just prior to each radar pulse transmission where clutter is weak or non-existent, and predicts the weight changes over each pulse repetition period based on the samples of previous weights. In this manner, the canceller loop operates with relatively clutter free signals which would otherwise degrade canceller performance, all as described in U.S. application Ser. No. 508,363.

In still a third mode of operation, the switches 24, 25, 32, and 33 are set as in mode 1 but the notch filters are switched into the loop. The notch filters are designed to have a bandwidth equal to the radar passband while the tuned amplifiers have passbands somewhat larger than the radar passbands. The weights are then derived on the interference signal near the radar passband but excluding it such that clutter does not affect the side-lobe canceller. In this mode, the tuned amplifier 36 is used as the matched filter of the system.

While the side-lobe canceller described above provides multiple modes of operation, each mode requires a finite settling time before loop weights provide acceptable cancellation. For set frequency radar transmission, therefore, interference cancellation is relatively successful. However, for radar frequencies changing on a pulse to pulse basis (frequency agility), the time required for loop settling prevents effective cancellation (particulary over near ranges of primary interest), prevents protection against barrage jamming, and substantially prohibits the use of a predicting mode of operation.

Figure 2:
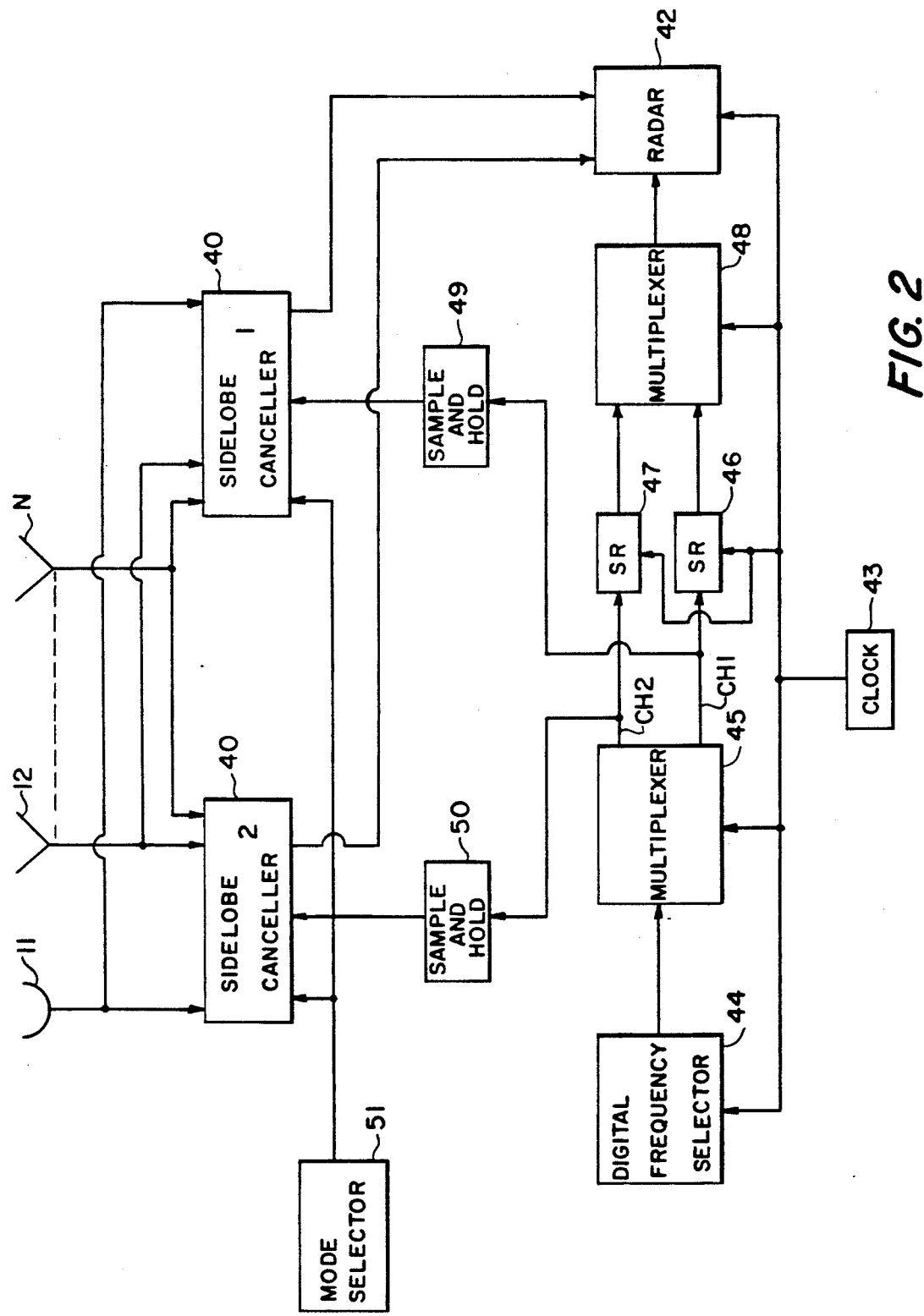
FIG. 2 is a schematic diagram showing the canceller system according to the present invention.

Turning now to FIG. 2, where like numerals indicate like elements throughout the drawings, a side-lobe canceller system is shown which allows the radar frequency to change on a pulse to pulse basis and still provide effective cancellation. Signals received at a scanning main radar antenna 11 and auxiliary antennas 1 ... N, are coupled as inputs to a pair of multiple-loop side-lobe cancellers 40 constructed as described with reference to FIG. 1. A mode selector 51 is also coupled to the side-lobe cancellers 40 and can be any conventional electrical or mechanical control which sets the previously described switches in accordance with the desired mode of operation. The output from each of the side-lobe cancellers 40 is then coupled to the main radar 42 where the output signals are displayed. A radar clock 43, formed from any conventional clock circuitry, provides a series of periodically occuring pulses which initiate radar pulse transmission thereby setting the pulse repetition period of the radar. The clock is additionally coupled to frequency selector 44, multiplexers 45 and 48, and shift registers 46 and 47, to control system timing as will be further described. Frequency selector 44 can be, for example, a conventional digital counting circuit that provides a digital number representing a given frequency for each pulse received from the radar clock. Although any cyclic counting circuit could be used, it is preferable to provide a counting circuit which provides a random output number representing a different frequency for each pulse of the radar clock. The output of the frequency selector 44 is coupled as input to any conventional electrical or mechanical multiplexer 45 having two outputs representing different channels. The first output, representing channel 1 (CH1), is coupled as input to sample and hold circuit 49 and shift register 46 while the second output, representing channel 2 (CH2), is coupled to sample and hold circuit 50 and shift register 47. The outputs from sample and hold circuits 49 and 50 are coupled as inputs to the side-lobe cancellers 40, while the shift register outputs are coupled to a second conventional multiplexer 48 whose output is, in turn, coupled back to the radar 42. Multiplexer 45 operates in response to each radar clock pulse to alternately couple the output of 44 to channel 1 or channel 2. In the same manner, multiplexer 48 operates in response to each radar clock pulse to alternately connect the outputs of shift registers 46 and 47 to the radar 42. In the present example, the multiplexers are synchronized so that when the output of 44 is coupled to channel 1, the output of shift register 47 is coupled to radar 42, and when the output of 44 is coupled to channel 2, the output of 46 is coupled to the radar 42. Elements 49 and 50 can be any conventional digital sample and hold circuits which sample the outputs of channels 1 and 2 and hold the value until the next sample is received. The stored values are then coupled to the input of the respective voltage controlled local oscillators of the side-lobe cancellers 40. The shift registers act in the known manner to read or output a digital value in response to each clock pulse from 43.

The operation of the inventive system will now be described with reference to FIG. 2. When interference sources (in this case jammers or other sources) are present, the interference signals are received by the main and auxiliary antennas at the radiated frequency. At the same time, in response to each radar clock pulse, the radar 42 triggers a radar pulse and the frequency selector 44 generates a number representing a new frequency at its output. Likewise, for each clock pulse the digital output from 44 is multiplexed between channel 1 and channel 2 as previously described. By way of example, if the output of 44 is coupled to channel 1 by multiplexer 45 on a first pulse from the clock 43, the number from 44 will be read into the shift register 46 and stored in the sample and hold 49. The stored value in the sample and hod 49 sets the value of the local oscillator in the side-C lobe canceler to tune the canceler to receive the frequency represented by the digital number. At the same time, multiplexer 48 reads the value of a number stored in shift register 47 of channel 2 and couples the same to radar 42 which transmits the radar pulse at that frequency represented by the digital number read from shift register 47. On the next consecutive pulse from clock 43, the multiplexer 48 reads the digital number stored in shift register 46 of channel 1 and couples the same to the radar 42 which transmits a radar pulse at the frequency represented by the number read from shift register 46(which is the same frequency as that to which the side-lobe canceller 1 is tuned). At the same time, multiplexer 45 couples a new number from 44 to channel 2 where it is read into shift register 47 and stored in sample and hold 50. The value stored in sample and hold 50 replaces any value previously stored there and sets the value of the local oscillator in the side-lobe canceller 2 to tune the canceller to receive the frequency represented by the currently stored digital number. The cycle is then repeated with the multiplexers alternately switching between channels 1 and 2 as previously described. As can be seen, the effect of the operation described above is to set a side-lobe canceller 40 at a given frequency, corresponding to a radar frequency, over two pulse repetition periods, and transmit a radar pulse corresponding to the set frequency on the second pulse period. It should be noted that in order to view the radar signal from the proper canceller, the output from side-lobe canceller 1 must be connected to a radar viewing indicator during the pulse period where the radar transmits at the frequency set by shift register 46, while the output from side-lobe canceller 2 must be connected to the viewing indicator during the pulse period where the radar transmits at the frequency set by shift register 47. This can be easily implemented by using a bilateral switch alternately connecting the side-lobe canceller outputs in synchronium with the multiplexer 48. In addition, in order for the radar to transmit at the proper frequency, it is obvious that the initiation of the radar pulse in response to any radar clock pulse, must be delayed or timed to allow the digital value, read from the shift register by multiplexer 48 on the same clock pulse, to set the radar transmission frequency.

As can be seen from the above description, the inventive system provides a pair of side-lobe cancellers which are each tuned to a frequency of radar transmission for a pulse period prior to actual radar pulse transmission. Contrary to conventional and other known systems, this allows time for the canceller loop to settle before any radar returns are actually received by the side-lobe canceller. As a result, the frequency of radar pulse transmission can be changed from one pulse to the next without a loss in cancellation for any radar range. In addition, the system provides effective cancellation to barrage jamming even with the pulse to pulse frequency changes. It is further realized that the system is effective to provide good cancellation in a variety of modes thereby making the system highly versatile. Further, since the canceller loop is allowed to operate for at least one pulse period prior to radar transmission, the predicting mode can be used with a frequency agile radar where normally the cancellation would be substantially limited or prohibited. The canceller system, according to the present invention, can additionally be implemented using conventional elements with only slight modifications to existing systems. All of these are new features not found in prior known systems as previously described.

Obviously, many modifications and variations of the present invention are possible in light of the above teachings. It is therefore to be understood that within the scope of the appended claims the invention may be practiced otherwise than as specifically described.

What is claimed is:

1. An interference suppression system for cancelling interference in a frequency agile signal receiving system comprising:
    main channel sensor means for receiving desired and interference signals;
    at least one auxiliary channel sensor means for receiving primarily interference signals;
    first canceller means coupled to said main channel sensor means and said at least one auxiliary channel sensor means for cancelling interference from said main channel signals and providing a first main channel output;
    second canceller means coupled to said main channel sensor means and said at least one auxiliary channel sensor means for cancelling interference from said main channel signals and providing a second main channel output; and
    means coupled to said first and second canceller means for alternately controlling said first and second canceller means to receive said sensor means signals at different frequencies.

2. The system of claim 1 wherein said means for controlling comprises:
    a clock means for delivering periodic clock pulses;
    a frequency selector means responsive to said clock means for generating an output having a value representing a specific frequency for each clock pulse;
    a first channel means including a first sample and hold circuit for sampling a value at an input and holding that value at an output;
    a second channel means including a second sample and hold circuit for sampling a value at an input and holding that value at an output;
    first multiplexer means responsive to the pulses from said clock means for coupling said selector means output alternately to said inputs of said first and second sample and hold circuits; and
    connecting means coupling the outputs from said first and second sample and hold circuits to said first and second canceller means, respectively, for controlling said frequency of sensor means signals received by each canceller means.

3. The system of claim 2 wherein said frequency selector means generates a random output value for each clock pulse.

4. The system of claim 2 wherein said system further includes:
    a first means coupled to said first channel means for storing the value input to said first sample and hold at an output;
    a second means coupled to said second channel means for storing the value input to said second sample and hold at an output;
    second multiplexer means responsive to pulses from said clock means for alternately coupling the outputs of said first and second storing means to a single output; and
    a radar coupled to receive and display said first and second main channel outputs and including an input means coupled to said single output for initiating a radar pulse, in response to each clock pulse, at a frequency represented by the value at said single output.

5. The system of claim 4 wherein said first and second multiplexer means are constructed and arranged such that when said first multiplexer means couples said selector output to said first channel means in response to a given clock pulse, the second multiplexer means couples the output of the second storing means to said radar input means, and when said first multiplexer means couples said selector output to said second channel means on the next consecutive clock pulse, the second multiplexer means couples the output of the first storing means to said radar input means.

6. The system of claim 5 wherein said first and second canceller means each include a local oscillator means having an input for setting the frequency of sensor means signals received by said canceller means, said connecting means coupling said first sample and hold output to the local oscillator means input of said first canceller means and said second sample and hold output to the local oscillator means input of said second canceller means.

7. The system of claim 6 wherein said frequency selector means is constructed to generate an output representing a different frequency for each consecutive clock pulse.

* * * * *